July 10, 1951 E. M. McNATT 2,560,464
MAGNETIC COMPASS COMPENSATION DEVICE
Filed Oct. 26, 1949
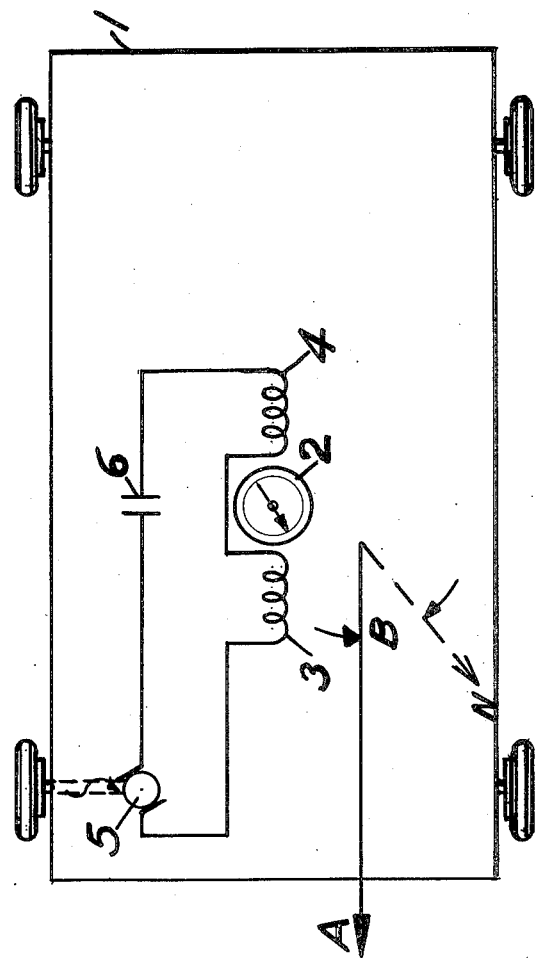
Eugene M. McNatt Inventor
By W. O. T Hulman Attorney Patented July 10, 1951

2,560,464

UNITED STATES PATENT OFFICE 2,560,464

MAGNETIC COMPASS COMPENSATION DEVICE

Eugene M. McNatt, Tulsa, Okla., assignor to Standard Oil Development Company, a corporation of Delaware Application October 26, 1949, Serial No. 123,713

1 Claim. (Cl. 33—225)

This invention concerns a novel type of compensation device for use with magnetic compasses. The compensation system of this invention is particularly intended to minimize errors in compass readings caused by changes in speed on the part of the vehicle in which the compass is carried.

The necessity for the device of this invention arises from the fact that the earth's magnetic field is not horizontal, except at the magnetic equator, but rather exists in an angular relation with respect to the earth. This angular disposition varies from nil at the magnetic equator, to a value of 90° at the earth's magnetic poles. Due to the angular direction of the earth's magnetic field a freely mounted, balanced compass needle which is carried in a moving vehicle, is subject to errors arising from the vertical component of the earth's field during changes in speed of the compass. For example, if a freely mounted, balanced compass is transported in an east-west direction, and the speed of this vehicle is changed, an error in the compass reading will occur. This error, arising from the action of the vertical component of the earth's field upon magnetic compasses during speed changes, may be referred to as the "speed change error."

Change in speed errors of the nature referred to are particularly serious in several applications. For example, when utilizing an automatic map plotting mechanism intended to plot the path of the vehicle upon which the mechanism is mounted, serious errors may occur in the plotted path due to errors of the compass utilized. In such an application the direction of motion of the vehicle is measured substantially continuously with reference to a magnetic compass. Since the plotting device integrates the azimuthal components of motion, referred to the compass, the effects of speed change errors are cumulative and may result in a plotted path which markedly varies from the true path. It is the principal object of this invention to provide a simple compensation device for use with magnetic compasses carried by moving vehicles of a nature so as to minimize compass errors due to changes in speed of the vehicle.

In describing the novel apparatus of this invention, reference will be made to the accompanying drawing in which the single figure diagrammatically represents the compensation device of this invention in operative position on a motor vehicle.

In considering the nature of speed change errors, it is apparent that these errors principally arise due to the pendulous mounting conventionally used on compasses. This effect causes the compass needle to swing out of the vertical plane under the forces of acceleration so as to subject the needle to the influence of the vertical component of the magnetic field. Upon consideration, it is apparent that this effect does not cause an error in the compass reading when the velocity is altered along a magnetic north and south line. However, when a change in speed occurs in such a direction as to have an east or west component, an error in the indication of the compass will appear. It may be demonstrated that the extent of this error is proportional to the product of the change in speed and the sine of the angle determined by the direction of movement with respect to magnetic north. As indicated, therefore, this equation shows that speed change errors are nil in the north-south direction, and are a maximum in the east-west direction.

In order to minimize this acceleration error a compensating torque may be applied to the compass needle proportional to the product of the speed change and the sine of the angle determined by the direction of motion and true north. A torque of this nature may conveniently be applied by imposing on the compass needle an auxiliary magnetic field parallel to the direction of motion of the compass, and proportional to changes in speed of the compass. In the case of a motor vehicle, the principal speed changes will be parallel to the direction of movement of the vehicle, as when the vehicle is accelerated or slowed down in a given direction. In this case the direction of a compensating field may conveniently be applied so as to be parallel to the motion of the vehicle. This condition can be fulfilled by positioning coils on the vehicle so that their axes are parallel to the longitudinal axis of the vehicle. In order that the strength of the magnetic field will vary in proportion to acceleration of the vehicle, a D. C. generator controlled in accordance with the speed of the vehicle may be used as a voltage source. By placing this generator in series in an LC circuit, the quantity of current passing through the inductance L will be a function of changes in speed of the vehicle. By utilization of apparatus of this nature, a magnetic field will be set up in the coil which will act to compensate the speed change errors of a compass positioned adjacent the coils.

Referring now to the drawing, numeral 1 diagrammatically represents a motor vehicle upon which the compass 2 is carried. If it is assumed that the vehicle is accelerating directly forward in the direction indicated by the arrow A, then compass 2 will erroneously indicate the direction of motion of the vehicle by an error proportional to the product of the change in speed and the sine of the angle B established by the direction of motion and magnetic north. In order to overcome this error, at least one coil, and preferably two coils are positioned adjacent the compass 2 so as to have their axes parallel to the longitudinal axis of the vehicle. Thus coils 3 and 4 may be utilized, respectively positioned directly in front and directly in back of the compass 2 on the vehicle. Coils 3 and 4 are connected in series together with a direct current generator 5, and a capacitor 6. The generator 5 is preferably of the tachometer type so that the D. C. voltage developed by the generator will vary directly as the speed of the rotor of the generator. The generator may be driven, as diagrammatically illustrated, by one of the wheels of the vehicle 1, so that the voltage output of the generator is directly proportional to the speed of the vehicle. However, since the voltage developed by the generator is a direct current voltage, the presence of the capacitor 6 in the series circuit with the inductive coils prevents the continuous flow of direct current through the coils 3 and 4. Consequently current will only flow through coils 3 and 4 when the speed of the vehicle is changed so that the current will act to set up a magnetic field having a magnetic vector parallel to the direction of motion of the vehicle, and proportional in magnitude to the changes in speed of the vehicle.

As a result when the vehicle is moving in a north-south direction, the magnetic field set up will coincide in direction with the magnetic field of the earth, so that no compensating force will be applied to the compass. However, when the vehicle is moving in an east-west direction, the magnetic field set up will act to apply a corrective torque to the compass needle. It is therefore to be seen that the magnetic field developed by the apparatus described is of a nature suitable to provide a compensating torque to the compass needle of the character indicated as being required to minimize speed change errors of the compass.

To secure exact compensation of change in speed errors, it is necessary to carefully select the electrical components of the system described. The value of these components will be a function of the angle of dip of the earth's magnetic field in the particular locality in which the device is used, and will also depend upon the particular type of compass employed. Thus, the amount of error depends in part upon the particular construction of the pendulous type compass employed. However, it is a particular feature of the device of this invention that extreme precision is not required in selecting the components of the device to substantially minimize speed change errors. This is true for the reason that the compensating magnetic field is only applied when speed is changed, so that a wide tolerance exists in the selection of the components of the device, while permitting large reductions in velocity change errors.

By way of a specific example, the following data relate to an operative embodiment of this invention which was effective in substantially eliminating change in speed errors. In this embodiment a U. S. Army compass was employed, identified as part No. S1-6000, designed for a 6-volt land Odograph. The description of this compass may be found in the War Department Technical Manual 5-9400. With this compass two coils were used, each consisting of 3300 turns of No. 25 Formex wire, having a resistance of 205 ohms, and having a self-inductance of 2.01 henries. The net inductance of these coils when connected series aiding with an 8 inch separation was 4.16 henries. Employing a permanent magnet field, D. C. generator, rated at 50 volts, 1000 R. P. M., coupled by V-belt to the drive shaft of the vehicle, it was found that a 56 microfarad, 600 volt D. C. oil filled capacitor provided suitable capacitance. Employing the indicated compass, generator, coils and capacitor, changes in speed errors were substantially eliminated.

The current developed by the type of circuit described, on analysis, will be found to contain a transient of the exponential decay type. This transient is undesirable and may best be minimized by adjusting the damping of the circuit to about 0.7 critical damping. To achieve this it is most convenient to adjust the resistance of the circuit. For this reason the circuit heretofore described may be modified by inclusion of a series resistance. It is apparent that alternatively the L and C values may be critically chosen to achieve this same result. As a practical matter in actually selecting the components to be used, it is generally most convenient to select the generator and coils in accordance with space limitations that may exist on the particular vehicle. Thereafter the value of the capacitance employed may be selected to obtain the desired corrective torque. This is most easily done by trial and error, varying the capacitance in accordance with actual observations of the compass behaviour.

What is claimed is:

A compensation device for a compass carried by a moving vehicle consisting of at least one coil mounted adjacent to the compass having the axis of the coil parallel to the longitudinal axis of the vehicle, a direct current generator driven at a speed proportional to the speed of the vehicle, and a capacitance, said coil, generator and capacitance being connected in series whereby a current is set up in the coil proportional to changes in speed of the vehicle operative to minimize errors of the compass.

EUGENE M. McNATT.

REFERENCES CITED

The following references are of record in the file of this patent:

FOREIGN PATENTS

| Number | Country | Date |
| --- | --- | --- |
| 666,594 | Germany | Oct. 24, 1938 |